United States Patent

Niemiec

[11] Patent Number: 5,857,658
[45] Date of Patent: Jan. 12, 1999

[54] CLAMPING BRACKET

[76] Inventor: David Stanley Niemiec, 8101 Montello Rd., Independence, Ohio 44131

[21] Appl. No.: 782,546

[22] Filed: Jan. 10, 1997

[51] Int. Cl.[6] ................................................. A01K 97/10
[52] U.S. Cl. ..................... 248/534; 248/231.71; 248/539
[58] Field of Search .................................. 248/534, 540, 248/541, 229.1, 229.15, 226.11, 228.1, 228.6, 230.1, 230.6, 231.71

[56] References Cited

U.S. PATENT DOCUMENTS

| | | | |
|---|---|---|---|
| 937,480 | 10/1909 | Smith et al. ........................ | 248/231.71 |
| 2,598,130 | 5/1952 | Mallison ........................ | 248/229.15 X |
| 2,896,896 | 7/1959 | Revzin ............................... | 248/229.15 |
| 2,988,310 | 6/1961 | Wright ........................... | 248/229.15 X |
| 4,903,929 | 2/1990 | Hoffman ............................ | 248/229.15 |
| 5,255,799 | 10/1993 | Haynes ........................... | 248/231.71 X |

Primary Examiner—Derek J. Berger

[57] ABSTRACT

A clamping bracket for clamping an object to a structure includes a bracket having height (H), an opening for receiving the object, two sides, and an end, said two sides having a cutout provided therein for receiving the structure; and, an adjustable gripping member attached to the sides for adjustably protruding into the cutouts so that the object is clamped between the end and the structure and the gripping member clamps the structure to the bracket.

6 Claims, 5 Drawing Sheets

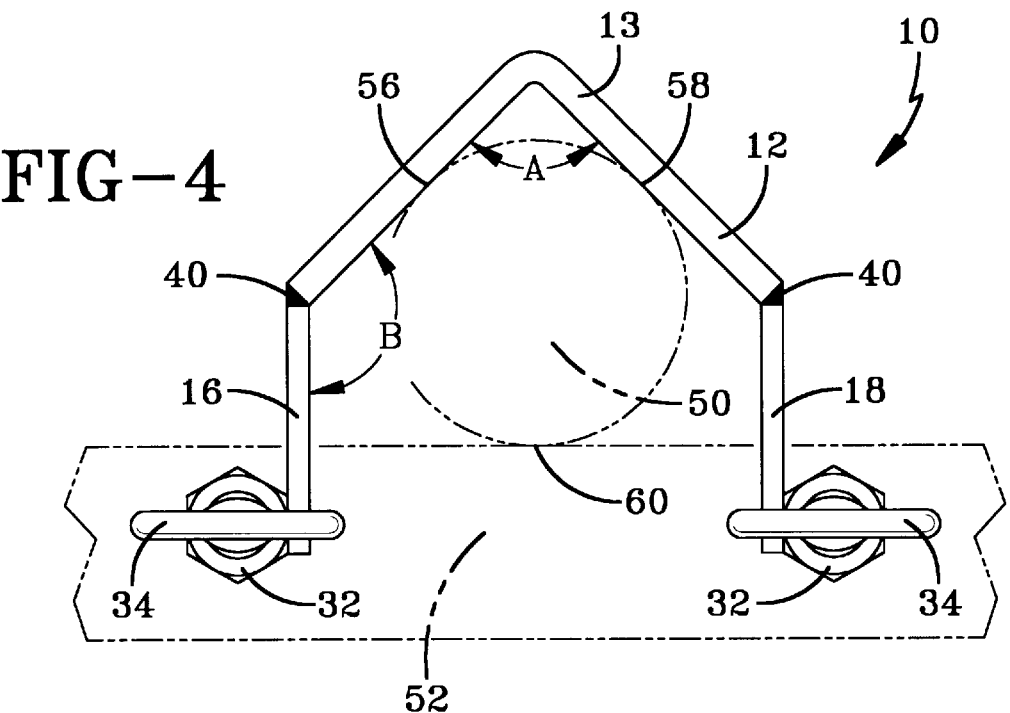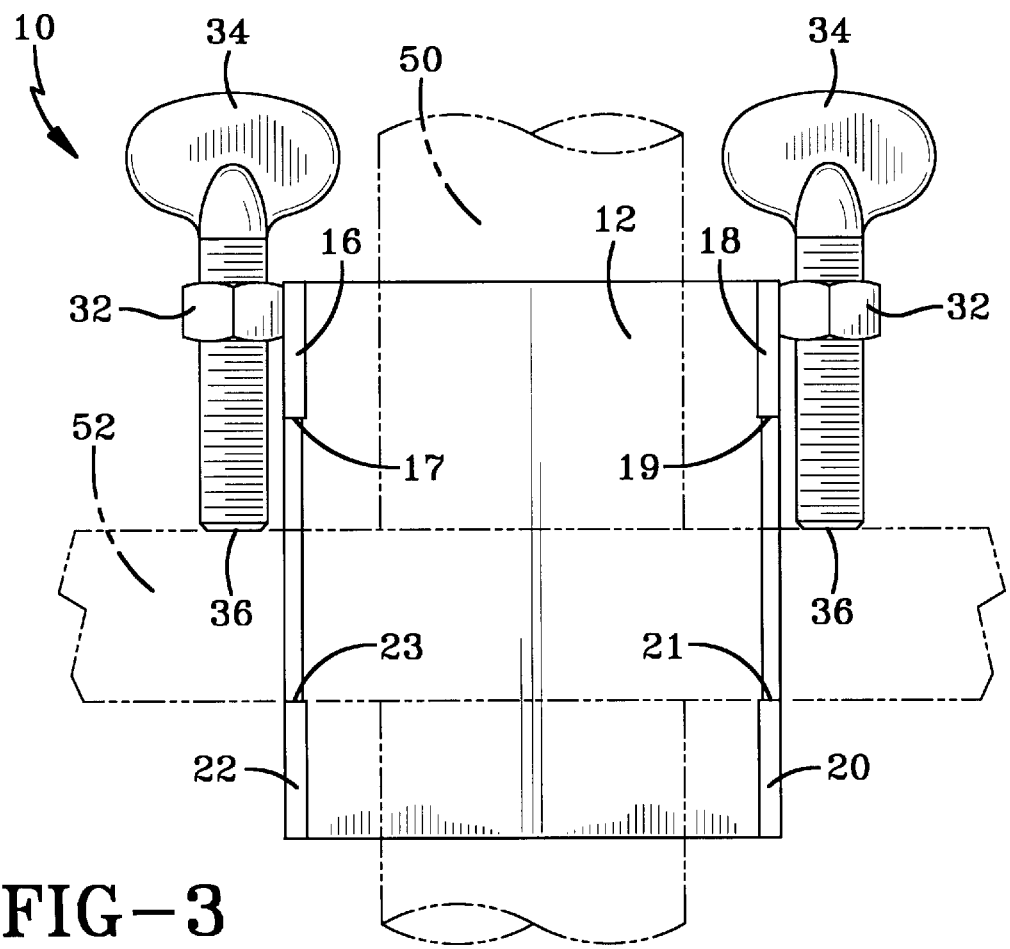

CLAMPING BRACKET

TECHNICAL FIELD

The present invention relates to brackets, and more particularly, to a clamping bracket for securing objects to the edge of a table or the like.

BACKGROUND OF THE INVENTION

It is frequently necessary to mount or hold objects in place at or near the edge of a table or other structure having a protruding edge. An example of this includes the need to secure an umbrella shaft to the edge of a table or bannister so that the umbrella provides shade for persons at or near the structure. Another example includes the need to firmly hold an article, such as a piece of wood, to the edge of a table so that the article may be worked on or with.

C-clamp type clamping brackets are a type of bracket that is well known and traditionally used in such situations to provide the retention function. A C-clamp bracket is a bracket having a shape like the letter C, with an extensible urging member for changing the width of the slot of the C. C-clamps are useful because they provide firm gripping forces and are easy to take on and off. One drawback to C-clamp type brackets, however, is that they provide only a single point gripping force. That is, the clamping force of the C-clamp is provided at a single point. Large objects, or objects having a curved surface, such as an umbrella pole, are therefore difficult to hold with a C-clamp. In such situations, a plurality of distributed C-clamps must be employed to provide an adequate clamping function. Having to apply multiple clamps, however, defeats the convenience, purpose and utility of the clamp itself.

Efforts to improve such systems have led to continuing developments to improve their versatility, practicality and efficiency.

DISCLOSURE OF THE INVENTION

An object of the present invention is to provide a clamping bracket for holding cylindrical or curved objects to another structure.

According to the present invention, a clamping bracket for clamping an object having a thickness to a structure having a width, said clamping bracket comprising:

a C-shaped barrel body, having an inner barrel wall, a barrel length running in an axial direction of said barrel shape and a barrel diameter running in the radial direction of said C-shaped barrel shape, said axial direction being generally perpendicular to said radial direction, said C-shaped barrel body having:
a cutout provided therein, said cutout having a) an axial length running in said axial direction and said radial direction, wherein said cutout has an axial length which is less than said barrel length and greater than the structure width and b) a radial width which is less than said barrel diameter and greater than the structure width; and
an adjustable protrusion means for adjustably protruding into said cutout in said axial direction,
whereby said barrel receives the object in said axial direction and said cutout receives the structure in the radial direction, and whereby the object is clamped between said barrel wall opposite of said cutout and the structure, and whereby said protrusion means is adjusted to provide a clamping force on the structure.

The present invention provides an improved clamping bracket which conveniently clamps objects with curved or cylindrically shaped surfaces. It is easy and economical to manufacture and easy to use.

These and other objects, features and advantages of the present invention will become more apparent in the light of the detailed description of exemplary embodiments thereof, as illustrated by the drawings.

BRIEF DESCRIPTION OF THE DRAWINGS

FIG. 3 is a rear view of a clamping bracket in accordance with the present invention.

FIG. 4 is a top view of a clamping bracket in accordance with the present invention.

BEST MODE FOR CARRYING OUT THE INVENTION

Figure 1:
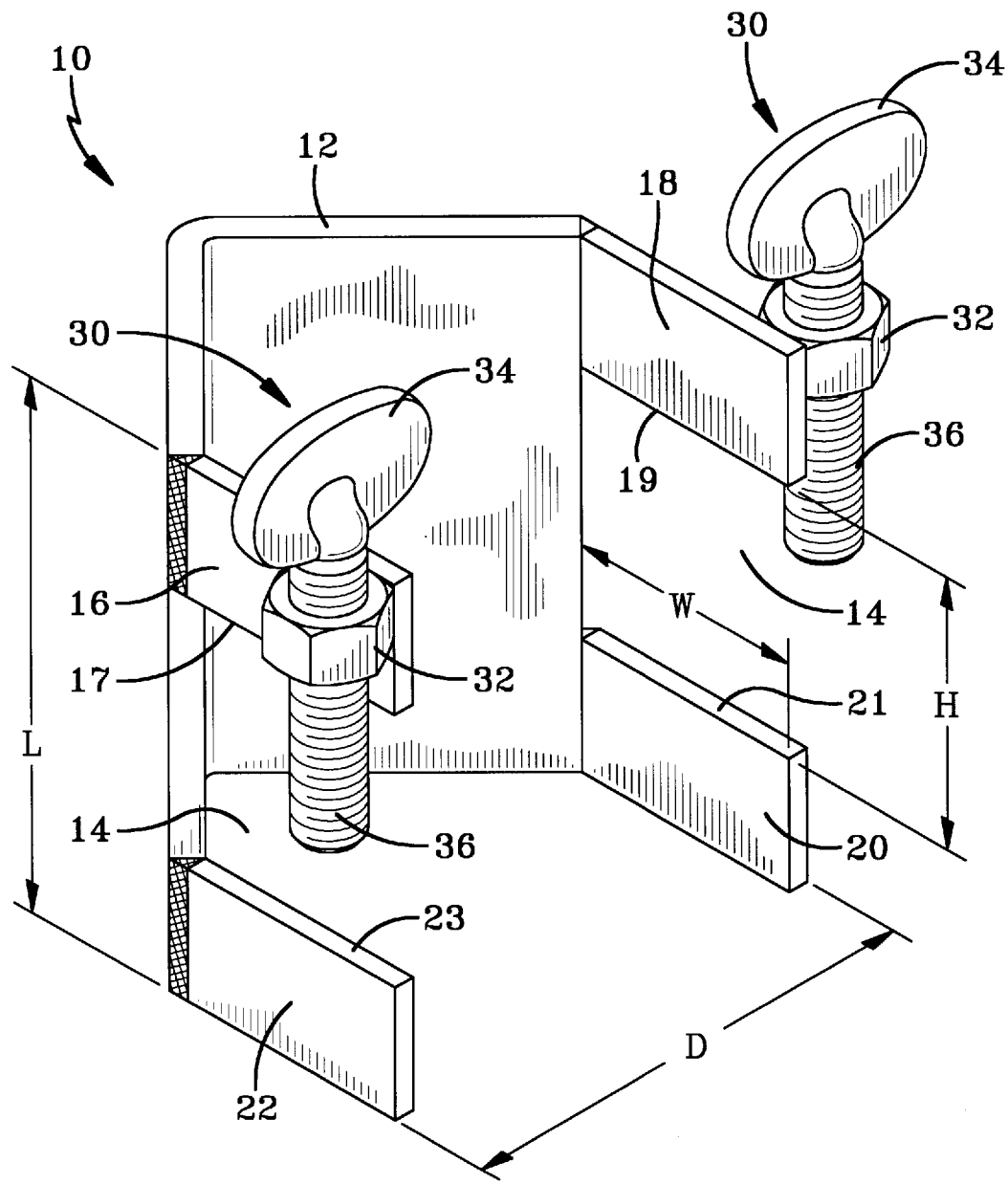
FIG. 1 is an isometric view of a clamping bracket in accordance with the present invention.
Figure 2:
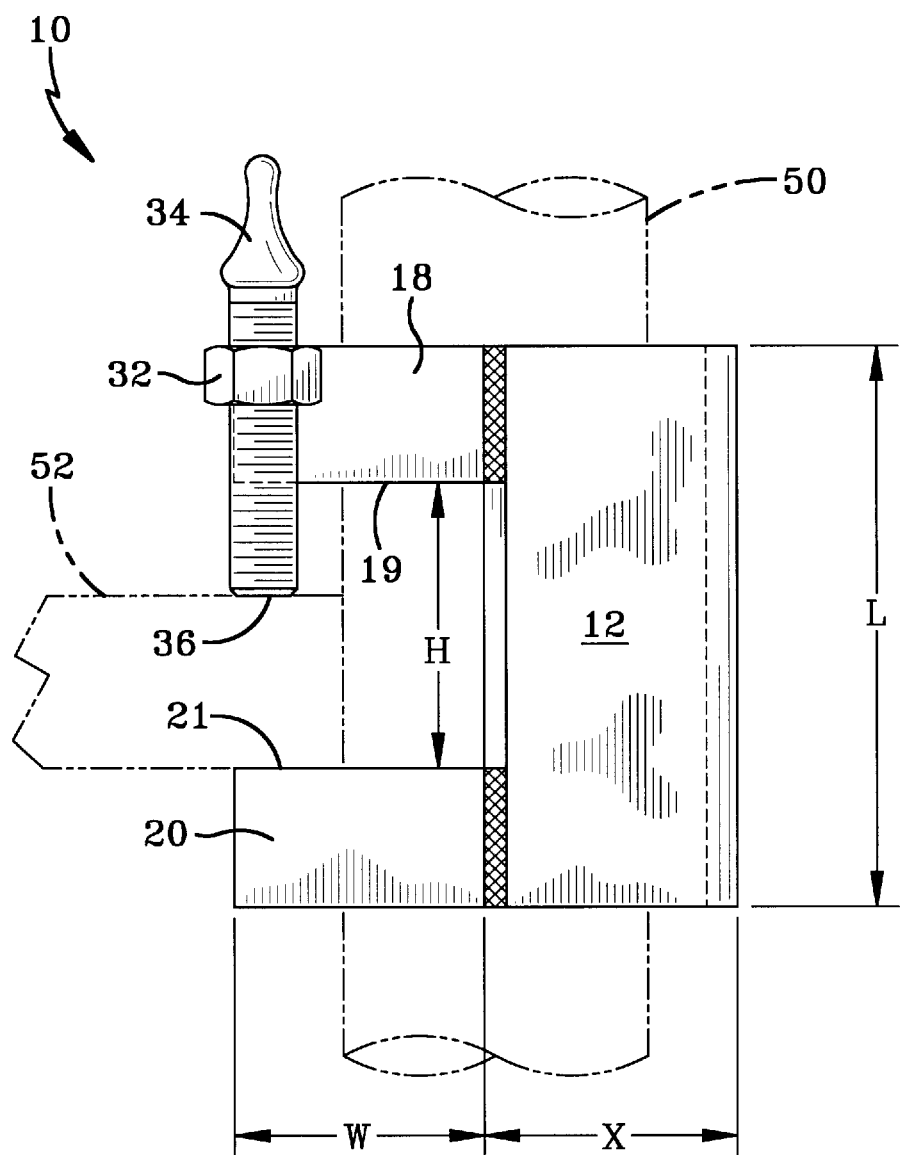
FIG. 2 is a side view of a clamping bracket in accordance with the present invention.
Figure 5:
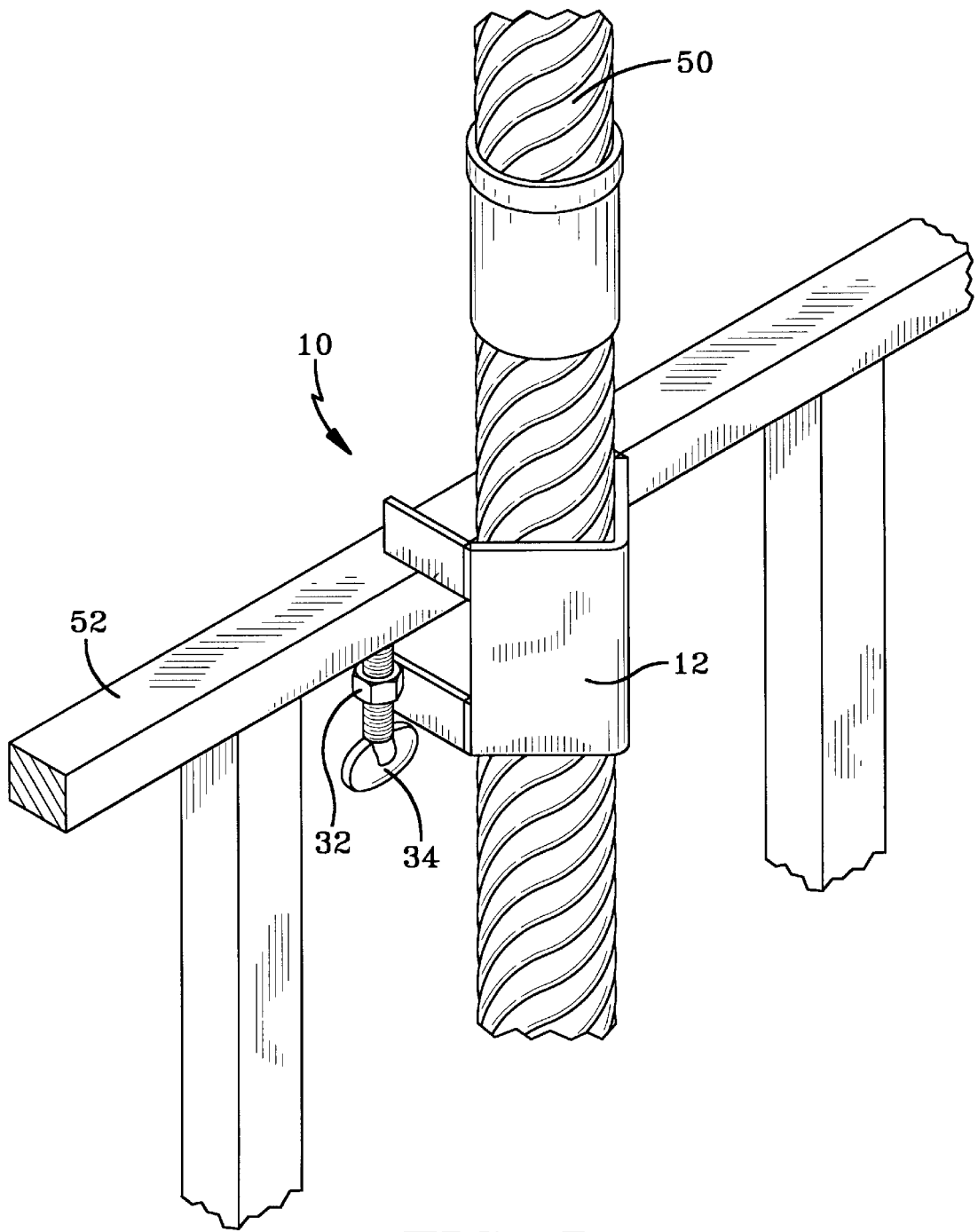
FIG. 5 is an isometric view of a clamping bracket in accordance with the present invention, clamping a pole to a deck rail.

Referring now to the drawings wherein like reference numerals designate like or corresponding parts throughout different views, there is shown in FIGS. 1–5 a clamping bracket 10 having, when viewed from the top, an open faced, or generally C-shaped barrel body or bracket 12 having an end 13 and sides (not numbered). The body of clamping bracket 10 is defined herein as C-shaped barrel shape, although other descriptive terms, such as open faced pentagonal, may be utilized to describe such a shape. The end 13 can be described as a right angle. The C-shaped barrel 12 has an axial length L running in an axial direction and a diameter D running in a radial direction. The plane of the axial length L is generally perpendicular to the plane of the radial diameter. A cutout 14 is provided in the sides of the barrel body 12. Cutout 14 has a height H and width W. Cutout 14 defines four legs 16, 18, 20, 22 in the barrel body 12. The axial inner surface 17, 19, 21, 23 of each leg defines a shoulder.

A pair of protrusion means 30 are attached to and provided on legs 16, 18 of body 12. Each protrusion means 30 is comprised of a nut 32 and a bolt 34. Bolt 34 is threadably engaged in nut 32 and when turned, moves in the axial direction L of the barrel body 12. One end of each bolt 34 defines a gripping surface 36.

All parts of the clamping bracket 10 are preferably made of metal or plastic or a combination thereof.

A method of making the clamping bracket of the present invention is to provide a piece of angled metal, and to weld four legs to the angled metal at weld points 40 as illustrated. The angle A in the angled metal is preferably on the order of 90 degrees and the legs 16, 18, 20, 22 are preferably welded or otherwise attached to the angled metal at an angle B on the order of 135 degrees. Nuts 32 are welded or otherwise attached to preferably two of the legs such that a bolt 34 threaded through each nut 32 will protrude into the cutout 14 created by the legs.

Alternatively, a flat piece of metal could be stamped, and then formed fo the desired shaped.

Alternatively, a cutout may be machined into a generally C-shaped barrel body, and nuts attached thereafter.

Referring now to FIG. 4, operation of clamping bracket 10 is as follows. The bracket 10 is placed around an object 50 (defined by dashed line), such as an umbrella pole. A structure 52 (defined by dashed lines,) such as a deck rail, is placed in cutout 14. It is to be noted that bolts 34 must be positioned so as not to interfere with placement of the structure 52 in cutout 14. Pressure is applied to the bracket in a manner so as to sandwich the object 50 between the bracket body 12 and the structure 52. Bolts 34 are then threaded through nuts 32 so as to sandwich structure 52 between the gripping surfaces 36 of the bolts and the gripping surfaces 21, 23 of legs 20, 22. In this manner, object 50 is clamped to structure 52. In order for bracket 10 to function properly, the combined cutout width W and inner diameter X of the barrel must be greater than the diameter of the object. Also, the height H of the cutout must be greater than the thickness of the structure.

It is to be noted that although the barrel has been described as a C-shaped barrel, it can be seen that the barrel illustrated in FIGS. 1–5 has an open faced pentagonal shape, or right angle bracket having four legs or protrusions extending therefrom, as seen from the top. The pentagonal shape of the barrel of the clamping bracket 10 illustrated in FIGS. 1–5 provides for two contact points 56, 58 to a cylindrical object inserted therein. An additional contact point 60 is made when the object 50 is pressed against the structure 52. Although other shapes may be provided for the barrel the pentagonal shape provides superior clamping force on cylindrical objects.

Figure 6:
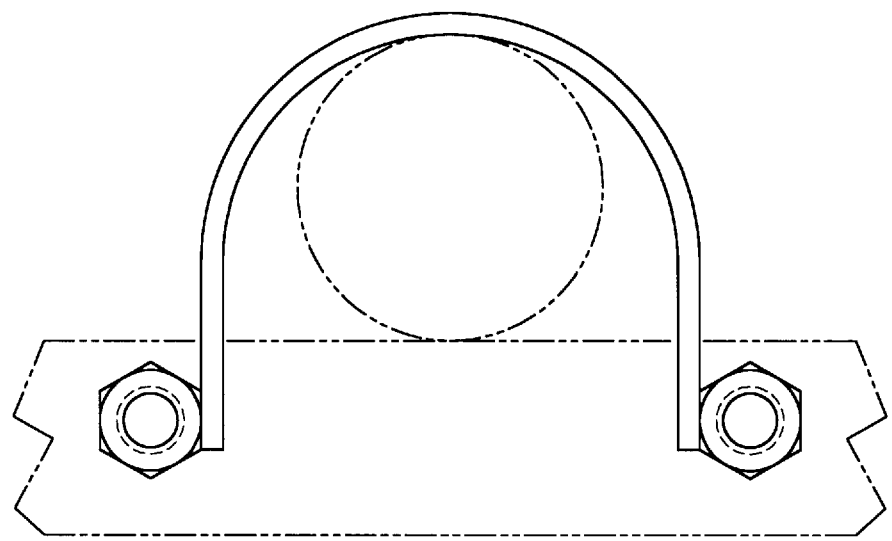
FIG. 6 is a top view of a clamping bracket in accordance with a second embodiment of the present invention.

Referring now to FIG. 6, an alternative shape for the barrel of the present invention as seen from the top can be generally circular or C-shaped.

Figure 7:
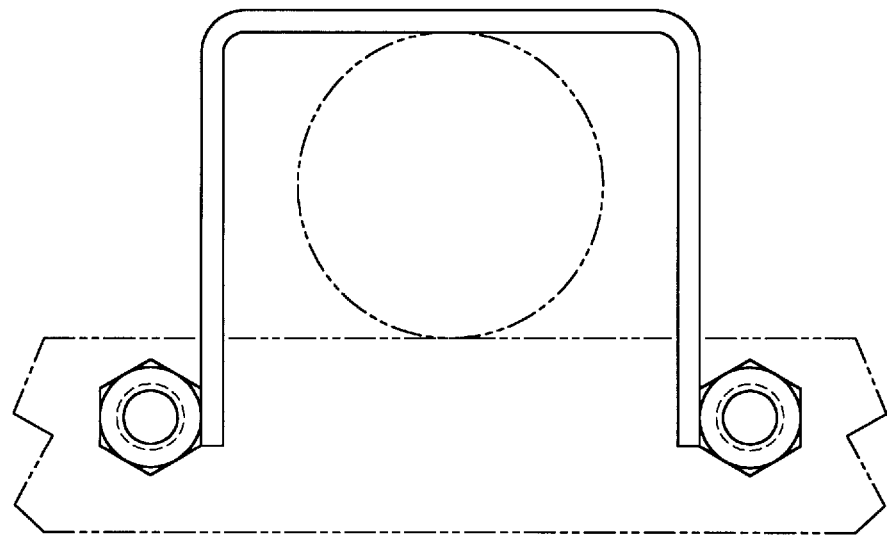
FIG. 7 is a top view of a clamping bracket in accordance with a third embodiment of the present invention.

Referring now to FIG. 7, an alternative shape for the barrel of the present invention as seen from the top can be generally open faced rectangular.

Although the invention has been shown and described with exemplary embodiments thereof, it should be understood by those skilled in the art that the foregoing and various other changes, omissions and additions may be made therein and thereto without departing from the spirit and scope of the invention.

I claim:

1. An apparatus for clamping an object to a structure comprising:

a barrel shaped body for receiving the object, the body having a length running in an axial direction and a cutout provided therein, the cutout thereby defining first and second sets of legs which extend in a direction substantially perpendicular to the axial direction; and, adjustable clamping means attached on at least one of the first set of legs, the clamping means having a clamping member that adjusts in a direction substantially parallel to the axial direction, wherein the body is adapted to received in the object in the axial direction and the cutout is adapted to received in the structure substantially perpendicular to the axial direction between the first and second sets of legs, and wherein the body is adapted to clamp the object between the structure and the body by compressive force applied to the body in a direction substantially perpendicular to the axial direction.

2. An apparatus in accordance with claim 1, wherein the body is generally open faced pentagonal in shape.

3. An apparatus in accordance with claim 1, wherein the body is generally open faced circular in shape.

4. An apparatus in accordance with claim 1, wherein the adjustable clamping means is comprised of a nut and a bolt.

5. An apparatus in accordance with claim 1, wherein the clamping member is adapted to apply clamping force only on the structure.

6. An apparatus in accordance with claim 1, wherein the clamping member is adapted to apply clamping force only on the structure and the body is adapted to clamp the object between the structure and the body by pressure applied to the body other than from the adjustable clamping means.

* * * * *